US012791823B2

United States Patent
Wu et al.

(12) United States Patent
(10) Patent No.: US 12,791,823 B2
(45) Date of Patent: Nov. 10, 2026

(54) OPTICAL SYSTEM

(71) Applicant: Actutek Corporation, Taoyuan City (TW)

(72) Inventors: Chia-Che Wu, Taoyuan City (TW); Chao-Chang Hu, Taoyuan City (TW); Yu-Chiao Lo, Taoyuan City (TW); Sin-Jhong Song, Taoyuan City (TW)

(73) Assignee: ACTUTEK CORPORATION, Taoyuan City (TW)

( * ) Notice: Subject to any disclaimer, the term of this patent is extended or adjusted under 35 U.S.C. 154(b) by 323 days.

(21) Appl. No.: 18/436,398

(22) Filed: Feb. 8, 2024

(65) Prior Publication Data

US 2024/0272400 A1 Aug. 15, 2024

Related U.S. Application Data

(60) Provisional application No. 63/484,133, filed on Feb. 9, 2023.

(51) Int. Cl.
*G02B 27/64* (2006.01)
*G02B 7/08* (2021.01)

(52) U.S. Cl.
CPC ............. *G02B 7/08* (2013.01); *G02B 27/646* (2013.01)

(58) Field of Classification Search
CPC .. G02B 27/646; G02B 7/02–10; G03B 13/36; G03B 30/00; G03B 5/00
See application file for complete search history.

(56) References Cited

U.S. PATENT DOCUMENTS 11,630,280 B2 * 4/2023 Hu ........................... G02B 7/02 359/822
2015/0160438 A1 * 6/2015 Okuda ............... G02B 13/0065 359/557
2018/0299651 A1 * 10/2018 Yu ...................... H02K 41/0354
2020/0209607 A1 * 7/2020 Hsu .......................... G02B 3/14
2021/0124144 A1 * 4/2021 Chen ........................ G02B 7/08
2021/0396946 A1 * 12/2021 Hu ........................... G02B 7/08

FOREIGN PATENT DOCUMENTS

CN 114721119 A 7/2022

OTHER PUBLICATIONS

Office Action issued on Aug. 8, 2024 for the corresponding Application No. 202420290485.1 in China.

* cited by examiner

*Primary Examiner* — Jonathan Y Jung
(74) *Attorney, Agent, or Firm* — MUNCY, GEISSLER, OLDS & LOWE, P.C.

(57) ABSTRACT

An optical system is provided. The optical system includes a first movable portion used for connecting a first optical element, a fixed portion, and a first driving assembly used for driving the first movable portion to move relative to the fixed portion. The first movable portion is movable relative to the fixed portion.

19 Claims, 9 Drawing Sheets

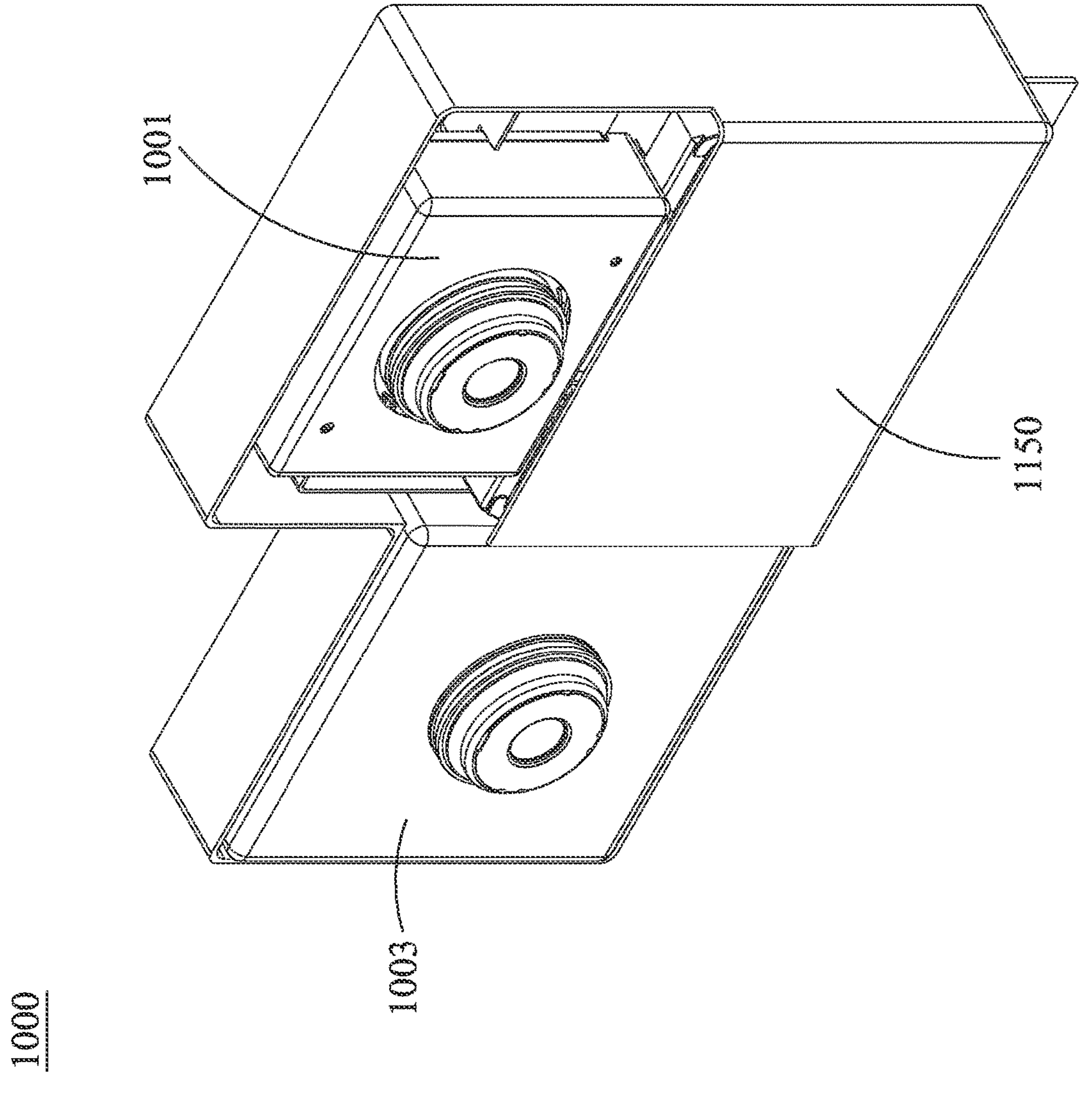
FIG. 1
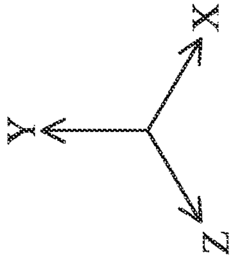

OPTICAL SYSTEM

CROSS REFERENCE TO RELATED APPLICATIONS

This Application claims priority of U.S. Provisional Application No. 63/484,133, filed on Feb. 9, 2023, the entirety of which is incorporated by reference herein.

BACKGROUND OF THE INVENTION

Field of the Invention

The present disclosure relates to an optical system.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical system to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical system and how to increase its durability has become an important issue.

BRIEF SUMMARY OF THE INVENTION

An optical system is provided in some embodiments. The optical system includes a first movable portion used for connecting a first optical element, a fixed portion, and a first driving assembly used for driving the first movable portion to move relative to the fixed portion. The first movable portion is movable relative to the fixed portion.

In some embodiments, the optical system further includes a first circuit element disposed on the fixed portion. The fixed portion includes a first case and a first bottom. The first circuit element includes a first segment, a second segment, and the third segment. The first segment connects to the second segment. The second segment connects to the third segment.

In some embodiments, a normal vector of the first segment is not parallel to a normal vector of the second segment. The normal vector of the second segment is not parallel to a normal vector of the third segment. The first segment is disposed between the first bottom and the first driving assembly. The second segment is exposed from the first bottom.

In some embodiments, the fixed portion further includes a second bottom used for connecting to a second optical element. Light enters the first optical element along a first axis. The first optical element and the second optical element are arranged along the first axis. The third segment and the second optical element at least partially overlap each other in a direction that the first extends.

In some embodiments, the second optical element includes a first surface, a first surface structural region, a second surface structural region, and a third surface structural region. The first surface structural region, the second surface structural region, and the third surface structural region are disposed on the first surface. The first surface structural region is transparent. The second surface structural region is transparent. The third surface structural region is opaque. The third surface structural region is between the first surface structural region and the second surface structural region. The first surface structural region and the first optical element at least partially overlap each other in the direction that the first axis extends.

In some embodiments, the optical system further includes an optical sensor, the second surface structural region and the optical sensor at least partially overlap each other in the direction that the first axis extends. The first surface structural region and the second surface structural region do not overlap each other in the direction that the first axis extends.

In some embodiments, the second optical element further includes a second surface and a third surface facing the second bottom. The first surface and the second surface are not parallel or perpendicular. The first surface and the third surface are not parallel or perpendicular. The second surface and the third surface are not parallel or perpendicular. The first surface structural region at least partially overlaps the second surface in the direction that the first axis extends.

In some embodiments, the first optical element at least partially overlaps the second surface in the direction that the first axis extends. The second surface structural region at least partially overlaps the third surface in the direction that the first axis extends. The optical sensor at least partially overlaps the third surface in the direction that the first axis extends. The first surface faces the optical sensor. The first surface faces the first optical element.

In some embodiments, the optical system further includes a first resilient element, a second resilient element, a third resilient element, a fourth resilient element, and a second circuit element. The first resilient element and the third resilient are plate-shaped. The second resilient element and the fourth resilient element are strip-shaped. The first movable portion movably connects to the fixed portion through the first resilient element and the second resilient element. The second circuit element movably connects to the fixed portion through the third resilient element and the fourth resilient element.

In some embodiments, the first resilient element directly connects to the first movable portion. The second resilient element directly connects to the first bottom. The third resilient element directly connects to the second bottom. The fourth resilient element directly connects to the second circuit element.

In some embodiments, the third resilient element and the third segment at least partially overlap each other in the direction that the first axis extends. The second circuit element includes a fourth segment, a bending portion, and a fifth segment. The fourth segment connects to the fifth segment through the bending portion. The optical sensor is disposed on the fourth segment. Normal vectors of the fourth segment and the fifth segment are different. The fixed portion further includes a second case. The second case includes a first opening. At least a portion of the bending portion is exposed from the first opening when viewed along a second axis perpendicular to the first axis.

In some embodiments, the optical system further includes a second driving assembly used for driving the optical sensing element to move relative to the fixed portion. The first driving assembly includes a first magnetic element and a first coil. The second driving assembly includes a second magnetic element and a second coil. The first coil and the first magnetic element are arranged in a first direction. The second coil and the second magnetic element are arranged in a second direction. The first direction is parallel to the first axis. The second direction is parallel to the first axis. The first direction and the second direction are opposite. The second resilient element and the first resilient element are arranged in the first direction. The third resilient element and the fourth resilient element are arranged in the second direction.

In some embodiments, a third axis is perpendicular to the first axis and the second axis. The first driving assembly is used for driving the first optical element moving along a direction parallel to the third axis. The second driving assembly is used for driving the optical sensor moving along the direction parallel to the third axis. Movable strokes of the first optical element and the optical sensor in the third axis are different.

In some embodiments, the movable stroke of the first optical element in the third axis is greater than the movable stroke of the optical sensor in the third axis. The fixed portion further includes a shell. The first case and the first bottom are arranged in the second direction. The first case and the second bottom are arranged in the second direction. The second case and the second bottom are arranged in the first direction. The shell and the second case are arranged in the second direction. The shell and the second bottom are arranged in the second direction.

In some embodiments, the shell and the first case do not overlap each other in the direction that the first axis extends. The shell and the first bottom do not overlap each other in the direction that the first axis extends. The second bottom and the first case at least partially overlap each other in the direction that the first axis extends. The second bottom and the first bottom at least partially overlap each other in the direction that the first axis extends. The third segment is disposed on the second case.

In some embodiments, the second bottom includes a recess. The second magnetic element is disposed in the recess. The optical sensor and the second coil are disposed on opposite sides of the second circuit element in the direction that the first axis extends. The second magnetic element is exposed from the recess in the direction that the first axis extends. The second magnetic element does not overlap the second coil in the direction that the second axis extends. The second bottom does not overlap the second coil in the direction that the second axis extends.

In some embodiments, the second magnetic element and the second optical element are arranged along the third axis. The second bottom and the second optical element are arranged along the first axis. The second bottom and the second optical element are arranged along the third axis.

In some embodiments, the second driving assembly further includes a third magnetic element, a third coil, a fourth magnetic element, and a fourth coil. The third magnetic element and the third coil are arranged along the direction parallel to the first axis. The fourth magnetic element and the fourth coil are arranged along the direction parallel to the first axis. The second coil has a second length in the direction that the second axis extends. The third coil has a third length in the direction that the third axis extends. The fourth coil has a fourth length in the direction that the second axis extends. The second length and the third length are different. The second length and the fourth length are different. The third length and the fourth length are different.

In some embodiments, the second length is greater than the third length. The second length is greater than the fourth length. The third length is greater than the fourth length.

In some embodiments, the optical system further includes a third optical element driving mechanism, wherein: the third optical element driving mechanism and the optical sensor are arranged along the second axis. The first optical element and the optical sensor are arranged along the third axis. The shell and the optical sensor at least partially overlap each other in the direction that the first axis extends. The shell and the third optical element driving mechanism do not overlap each other in the direction that the first axis extends.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 1 is a schematic view of an optical system.

DETAILED DESCRIPTION OF THE INVENTION

Figure 2:
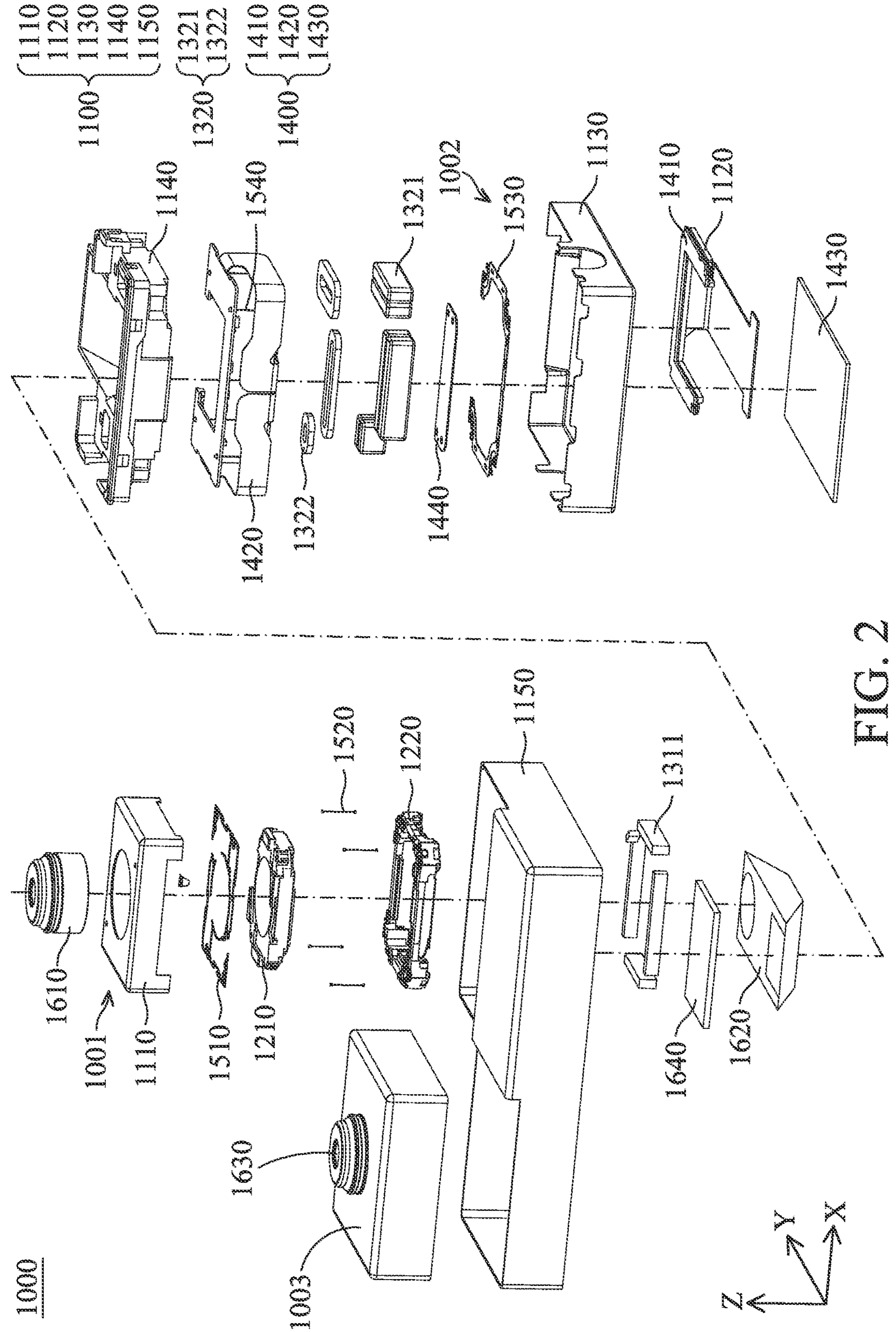
FIG. 2 is an exploded view of the optical system.

The following disclosure provides many different embodiments, or examples, for implementing different features of the provided subject matter. Specific examples of elements and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 3:
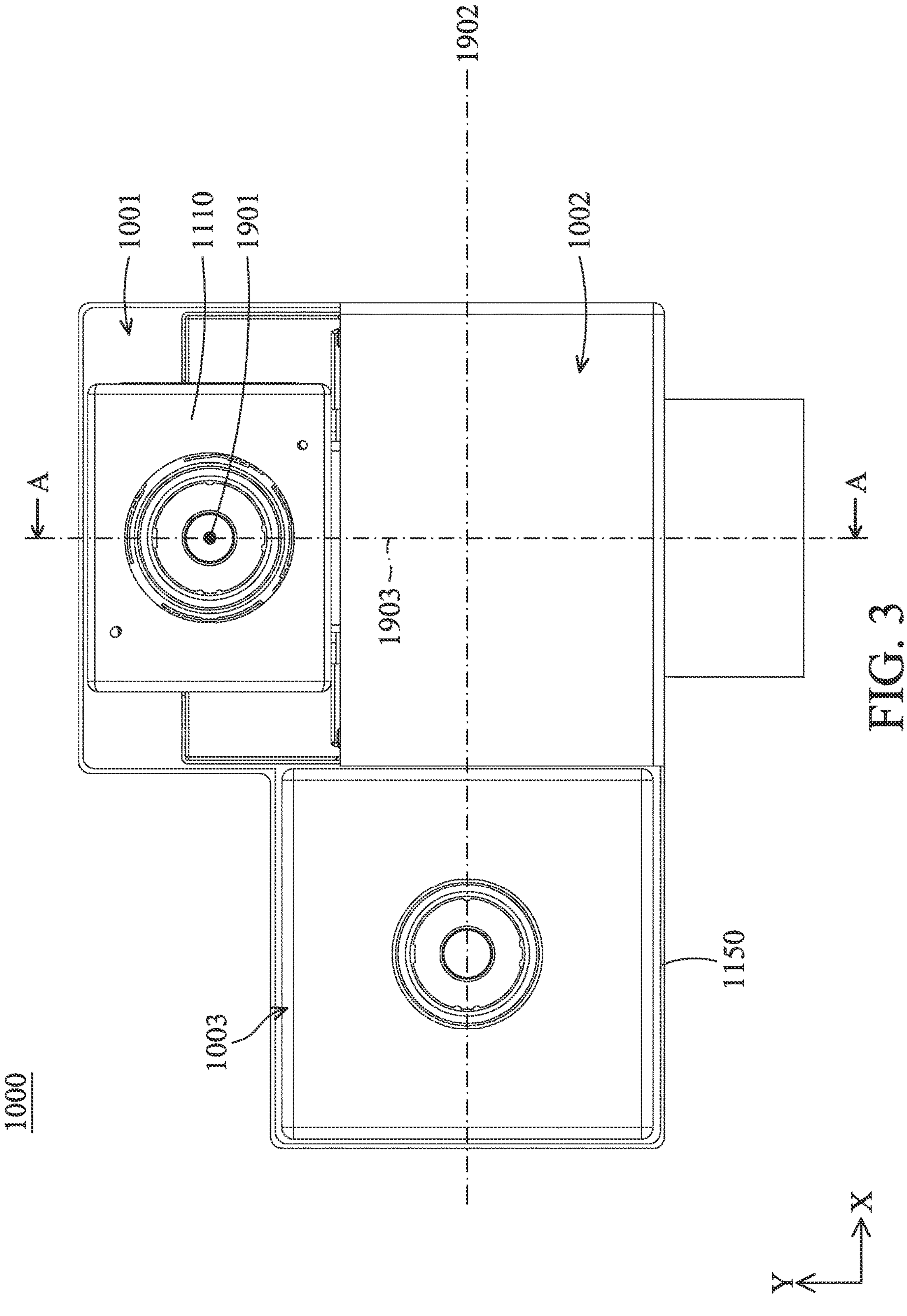
FIG. 3 is a top view of the optical system.
Figure 4:
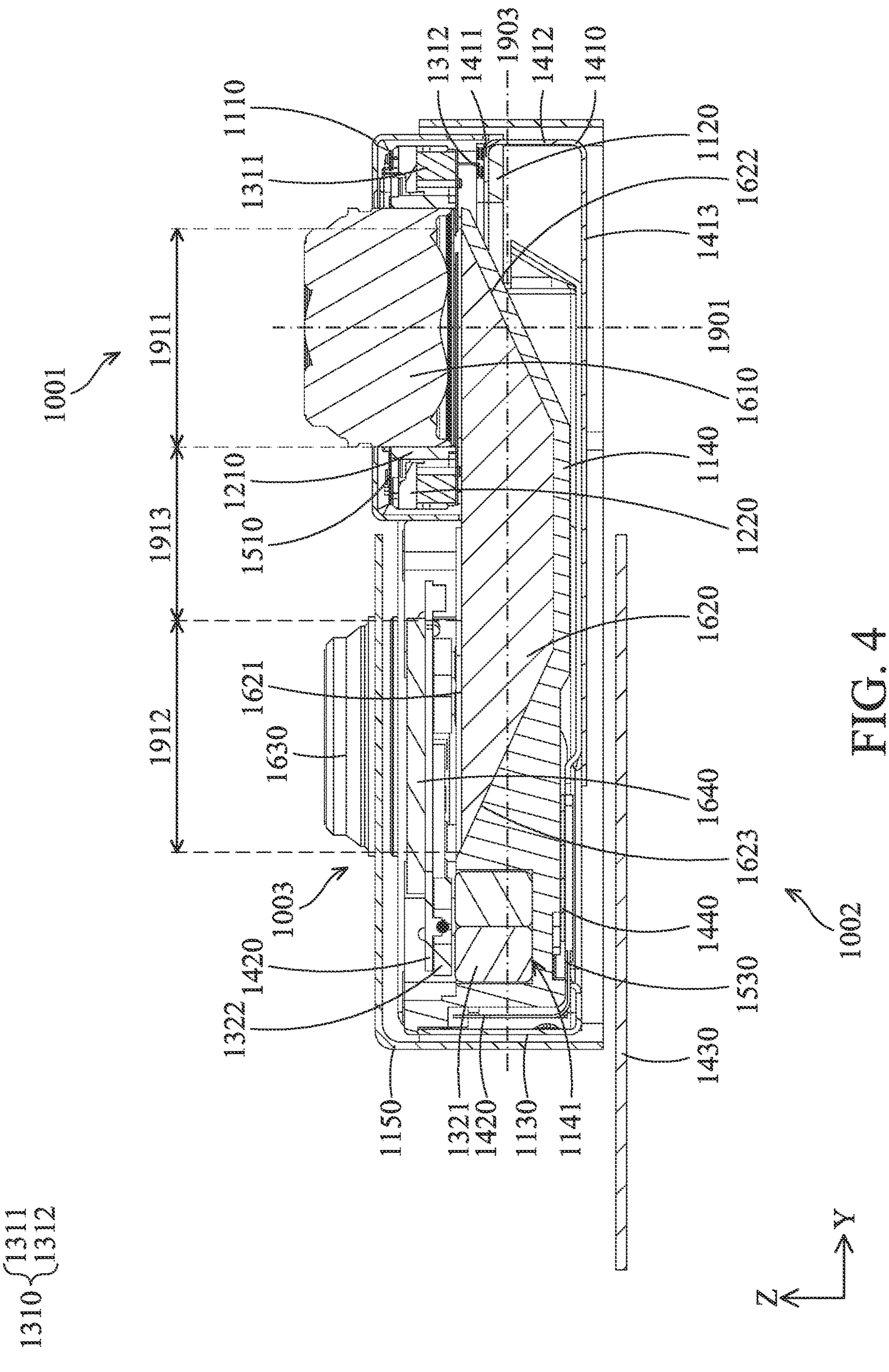
FIG. 4 is a cross-sectional view illustrated along a line A-A in FIG. 3.

Embodiments of the present disclosure provide an optical system to drive optical elements to move. For example, FIG. 1 is a schematic view of an optical system 1000. FIG. 2 is an exploded view of the optical system 1000. FIG. 3 is a top view of the optical system 1000. FIG. 4 is a cross-sectional view illustrated along a line A-A in FIG. 3.

As shown in FIG. 1 to FIG. 4, the optical system 1000 may mainly include a first optical element driving mechanism 1001, a second optical element driving mechanism 1002, and a third optical element driving mechanism 1003. Specifically, the optical system 1000 may include a fixed portion 1100 (which includes a first case 1110, a first bottom 1120, a second case 1130, a second bottom 1140, and a shell 1150), a first movable portion 1210, a second movable portion 1220, a first driving assembly 1310 (which includes a first magnetic element 1311 and a first coil 1312), a second driving assembly 1320 (which includes a second magnetic element 1321 and a second coil 1322), a circuit assembly 1400 (which includes a first circuit element 1410, a second circuit element 1420, and a third circuit element 1430), a strengthen element 1440, a first resilient element 1510, a second resilient element 1520, a third resilient element 1530, and a fourth resilient element 1540.

The optical system 1000 may be used for driving a first optical element 1610, a third optical element 1630, and an optical sensor 1640 to move relative to the fixed portion 1100, and transfer light entering the first optical element 1610 and passing through a second optical element 1620 to the optical sensor 1640 for reading optical signal. For example, the first optical element driving mechanism 1001 may be used for driving the first optical element 1610, the second optical element driving mechanism 1002 may be used for driving the optical sensor 1640, and the third optical element driving mechanism 1003 may be used for driving the third optical element 1630.

In some embodiments, the first case 1110 and the first bottom 1120 may combine with each other to form a shell of the first optical element driving mechanism 1001, and the second case 1130 and the second bottom 1140 may combine with each other to form a shell of the second optical element driving mechanism 1002. The first optical element driving mechanism 1001, the second optical element driving mechanism 1002, and the third optical element driving mechanism 1003 may be disposed in the shell 1150 to protect elements between them. For example, as shown in FIG. 3, the shell 1150 may surround the first optical element driving mechanism 1001, the second optical element driving mechanism 1002, and the third optical element driving mechanism 1003.

Furthermore, as shown in FIG. 3 and FIG. 4, the shell 1150 may at least partially overlap the optical sensor 1640 in a direction that a first axis 1901 extends, such as the optical sensor 1640 is not exposed from the shell 1150 when viewed along the first axis 1901 as shown in FIG. 3. Furthermore, the shell 1150 and the third optical element driving mechanism 1003 do not overlap each other when viewed along the first axis 1901.

In some embodiments, in a direction that the first axis 1901 extends, as shown in FIG. 3 and FIG. 4, at least a portion of the shell 1150 does not overlap the first case 1110 and the first bottom 1120, and at least a portion of the second bottom 1140 may overlap the first case 1110 and the first bottom 1120 to reduce the size in other directions to achieve miniaturization.

For example, as shown in FIG. 4, the first case 1110 may be affixed on the first bottom 1120, and other elements of the first optical element driving mechanism 1001 (e.g. the first movable portion 1210, the second movable portion 1220, the first magnetic element 1311, the first circuit element 1410, the first resilient element 1510, and the second resilient element 1520) may be disposed between the first case 1110 and the first bottom 1120.

Furthermore, as shown in FIG. 4, the second case 1130 may be affixed on the second bottom 1140, and other elements of the second optical element driving mechanism 1002 (e.g. the second magnetic element 1321, the second coil 1322, the second circuit element 1420, the strengthen element 1440, the third resilient element 1530, and the fourth resilient element 1540) may be disposed between the second case 1130 and the second bottom 1140. The strengthen element 1440 may include metal and may be disposed on the second circuit element 1420 to increase mechanical strength of the second circuit element 1420 in specific positions. The third circuit element 1430 may be disposed under the optical system 1000, such as may at least partially overlap the second optical element 1620 and the optical sensor 1640 in a direction that the first axis 1901 extends, so the optical system 1000 may be electrically connected to other devices.

As shown in FIG. 4, the first optical element 1610 may be disposed in the first optical element driving mechanism 1001, and the second optical element 1620 may extend across the first optical element driving mechanism 1001 and the second optical element driving mechanism 1002 along the Y axis, such as a portion of the second optical element 1620 may be disposed between the first case 1110 and the first bottom 1120, and another portion of the second optical element 1620 may be disposed between the second case 1130 and the second circuit element 1420 and arranged with the first optical element 1610 and the optical sensor 1640 in the direction parallel to the first axis 1901. The optical sensor 1640 may be disposed in the second optical element driving mechanism 1002. In some embodiments, the second magnetic element 1321 and the second optical element 1620 may arrange along a third axis 1903, and the second bottom 1140 and the second optical element 1620 may arrange along the first axis 1901 and the third axis 1903.

In some embodiments, the first movable portion 1210 and the second movable portion 1220 are movably connected to the fixed portion 1100, such as the first movable portion 1210 and the second movable portion 1220 may movably connect to the fixed portion 1100 through the first resilient element 1510 and the second resilient element 1520. The first optical element 1610 may connect to the first movable portion 1210 to move the first optical element 1610 relative to the fixed portion 1100 when the first movable portion 1210 moves relative to the fixed portion 1100. Furthermore, the optical sensor 1640 may be disposed on the second circuit element 1420, and the second circuit element 1420 may movably connect to the fixed portion 1100, such as through the third resilient element 1530 and the fourth resilient element 1540. Therefore, when the second circuit element 1420 moves relative to the fixed portion 1100, the optical sensor 1640 may be moved relative to the fixed portion 1100 to achieve auto focus (AF) or optical image stabilization (OIS).

In some embodiments, the first optical element 1610 and the optical sensor 1640 may move relative to the second optical element 1620. In some embodiments, the movable stroke (the maximum range that the first optical element 1610 or the optical sensor 1640 can move) of the first optical element 1610 may be different from the movable stroke of the optical sensor 1640, such as the movable stroke of the first optical element 1610 may be greater than the movable stroke of the optical sensor 1640.

In some embodiments, the first optical element 1610, the second optical element 1620, and the third optical element 1630 may be, for example, a lens, a mirror, a prism, a reflective polished surface, an optical coating, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

In some embodiments, the first driving assembly 1310 may be disposed between the fixed portion 1100 and the second movable portion 1220 to drive the first movable portion 1210 and the second movable portion 1220 moving relative to the fixed portion 1100, such as in a direction parallel to the third axis 1903. Moreover, the second driving assembly 1320 may be disposed between the fixed portion 1100 and the second circuit element 1420 to drive the second circuit element 1420 moving relative to the fixed portion 1100, such as in a direction parallel to the third axis 1903. Therefore, auto focus and optical image stabilization may be achieved.

In this embodiment, the first driving assembly 1310 and the second driving assembly 1320 may include a combination of magnetic elements and coils, but the present disclosure is not limited thereto. For example, the first driving assembly 1310 and the second driving assembly 1320 may also include other driving elements, such as piezoelectric elements or shape memory alloy elements, depending on design requirements.

In some embodiments, as shown in FIG. 4, the first coil 1312 and the first magnetic element 1311 may arrange in a first direction (e.g. the +Z direction), and the second coil 1322 and the second magnetic element 1321 may arrange in a second direction (e.g. the −Z direction). The first direction and the second direction may be parallel to the first axis 1901 and may be opposite.

In some embodiments, as shown in FIG. 4, the second bottom 1140 may include a recess 1141, and the second magnetic element 1321 may be disposed in the recess 1141. The second magnetic element 1321 may be exposed from the recess 1141 in the direction that the first axis 1901 extends. The second coil 1322 may be disposed on the second circuit element 1420, and the optical sensor 1640 and the second coil 1322 may be disposed on opposite sides of the second circuit element 1420. In some embodiments, in the direction that the second axis 1902 extends, the second magnetic element 1321 and the second coil 1322 do not overlap each other, and the second bottom 1140 and the second coil 1322 do not overlap each other. In some embodiments, the first axis 1901, the second axis 1902, and the third axis 1903 may be perpendicular to each other.

In some embodiments, as shown in FIG. 4, the first case 1110 and the first bottom 1120 may arrange in the second direction, the first case 1110 and the second bottom 1140 may also arrange in the second direction, and the second case 1130 and the second bottom 1140 may arrange in the first direction. The first case 1110 and the second case 1130 may be disposed on opposite sides of the second bottom 1140. In some embodiments, the shell 1150 and the second case 1130 (and the second bottom 1140) may arrange in the second direction to cover and protect the second case 1130 and the second bottom 1140.

For example, as shown in FIG. 4, the first magnetic element 1311 may be disposed on the second movable portion 1220, and the first coil 1312 may be disposed on the fixed portion 1100 (e.g. embedded in a circuit board on the first bottom 1120). When current is provided to the first coil 1312, an electromagnetic force is generated between the first coil 1312 and the first magnetic element 1311 to drive the first movable portion 1210 and the second movable portion 1220 moving relative to the fixed portion 1100. In some embodiments, positions of the first magnetic element 1311 and the first coil 1312 may be interchanged, such as the first magnetic element 1311 may be disposed on the fixed portion 1100 and the first coil 1312 may be disposed on the second movable portion 1220, depending on design requirement.

In some embodiments, the circuit assembly 1400 may be a flexible printed circuit board (PCB) which may be adhered on the fixed portion 1100. In some embodiments, the circuit assembly 1400 is electrically connected to electronic elements inside or outside the optical system 1000. For example, the circuit assembly 1400 may transfer electrical signal to the first driving assembly 1310 and the second driving assembly 1320 to control the movement of the first optical element 1610 and the optical sensor 1640 in different directions, so functions such as auto focus, optical image stabilization, and zooming, etc., may be achieved.

In some embodiments, as shown in FIG. 4, the first circuit element 1410 may include a first segment 1411, a second segment 1412, and a third segment 1413, the first segment 1411 may connect to the second segment 1412, the second segment 1412 may connect to the third segment 1413, and the first segment 1411 may connect to the third segment 1413 through the second segment 1412. In some embodiments, normal vectors of the first segment 1411 and the second segment 1412 may be not parallel, and normal vectors of the second segment 1412 and the third segment 1413 may also be not parallel. In some embodiments, the first segment 1411 may be disposed between the first bottom 1120 and the first driving assembly 1310, and the second segment 1412 may be exposed from the first bottom 1120. In some embodiments, the third segment 1413 may at least partially overlap the second optical element 1620 and the second bottom 1140 and exposed from the second bottom 1140 in a direction that the first axis 1901 extends (e.g. the Z direction). In some embodiments, the third segment 1413 may be disposed on the second case 1130, such as in contact with a surface of the second case 1130 facing away from the optical sensor 1640.

In some embodiments, as shown in FIG. 4, incident light may enter the optical system 1000 along the first axis 1901, reaches the first optical element 1610 in advance, transports in the second optical element 1620, and then achieves the optical sensor 1640. For example, light from the first optical element 1610 may enter a first surface 1621 of the second optical element 1620, and then exit the second optical element 1620 from the first surface 1621 to reach the optical sensor 1640.

Specifically, as shown in FIG. 4, the second optical element 1620 may include a first surface structural region 1911, a second surface structural region 1912, and a third surface structural region 1913 disposed on the first surface 1621. The first surface structural region 1911 and the second surface structural region 1912 may be transparent to allow light passing through. The third surface structural region 1913 may be opaque to reflect the light transporting in the second optical element 1620. In some embodiments, the third surface structural region 1913 may be between the first surface structural region 1911 and the second surface structural region 1912. The first surface structural region 1911 may at least partially overlap the first optical element 1610, and the second surface structural region 1912 may at least partially overlap the third optical element 1630, and the first surface structural region 1911 and the second surface structural region 1912 may be not overlap with each other in the direction that the first axis 1901 extends (e.g. the Z direction). Therefore, the light may enter the second optical element 1620 through the first surface 1621 of the second optical element 1620, and exits the second optical element 1620 from the first surface 1621 to reach the optical sensor 1640 for reducing the size of the optical system 1000 in the Z direction to achieve miniaturization.

Furthermore, the second optical element 1620 may further include a second surface 1622 and a third surface 1623 facing the second bottom 1140, and the second surface 1622 and the third surface 1623 may face different directions. In some embodiments, the first surface 1621, the second surface 1622, and the third surface 1623 may be not parallel or perpendicular to each other. The first surface structural region 1911 and the first optical element 1610 may at least partially overlap the second surface 1622, and the second surface structural region 1912 and the optical sensor 1640 may at least partially overlap the third surface 1623 in a direction that the first axis 1901 extends. Therefore, when the light traveling along the first optical element 1610 and the first surface structural region 1911 into the second optical element 1620, the light will be reflected by the second surface 1622 to have a component parallel to the third axis 1903, so the light can travel in the X direction. Afterwards, when the light reaches the third length 1923, the light will be reflected by the third surface 1623 to change its direction, and then leaves the third length 1923 from the second surface structural region 1912 to reach the optical sensor 1640. In other words, the first surface 1621 may face the first optical element 1610 and the optical sensor 1640.

Figure 5:
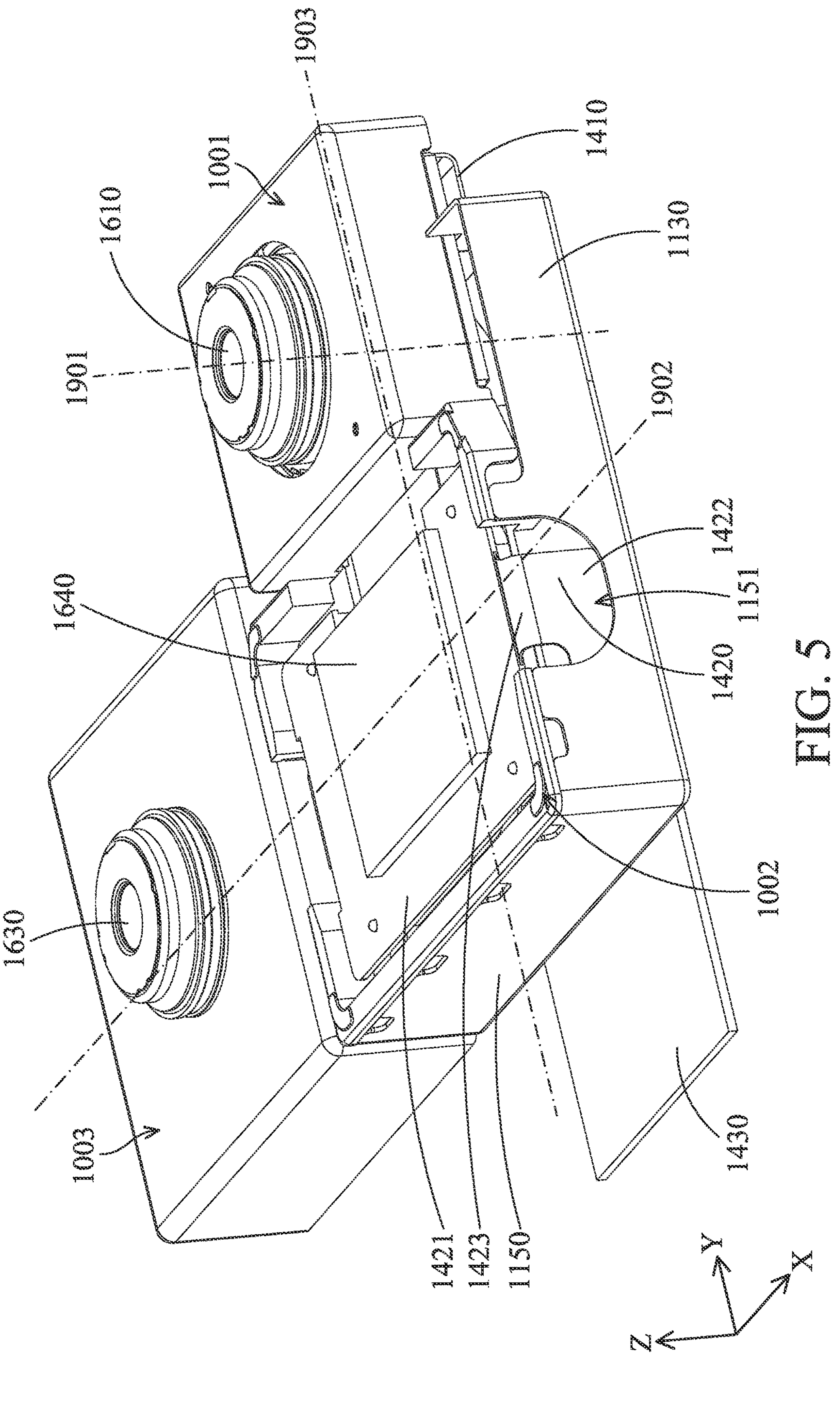
FIG. 5 is a schematic view of some elements of the optical system.
Figure 6:
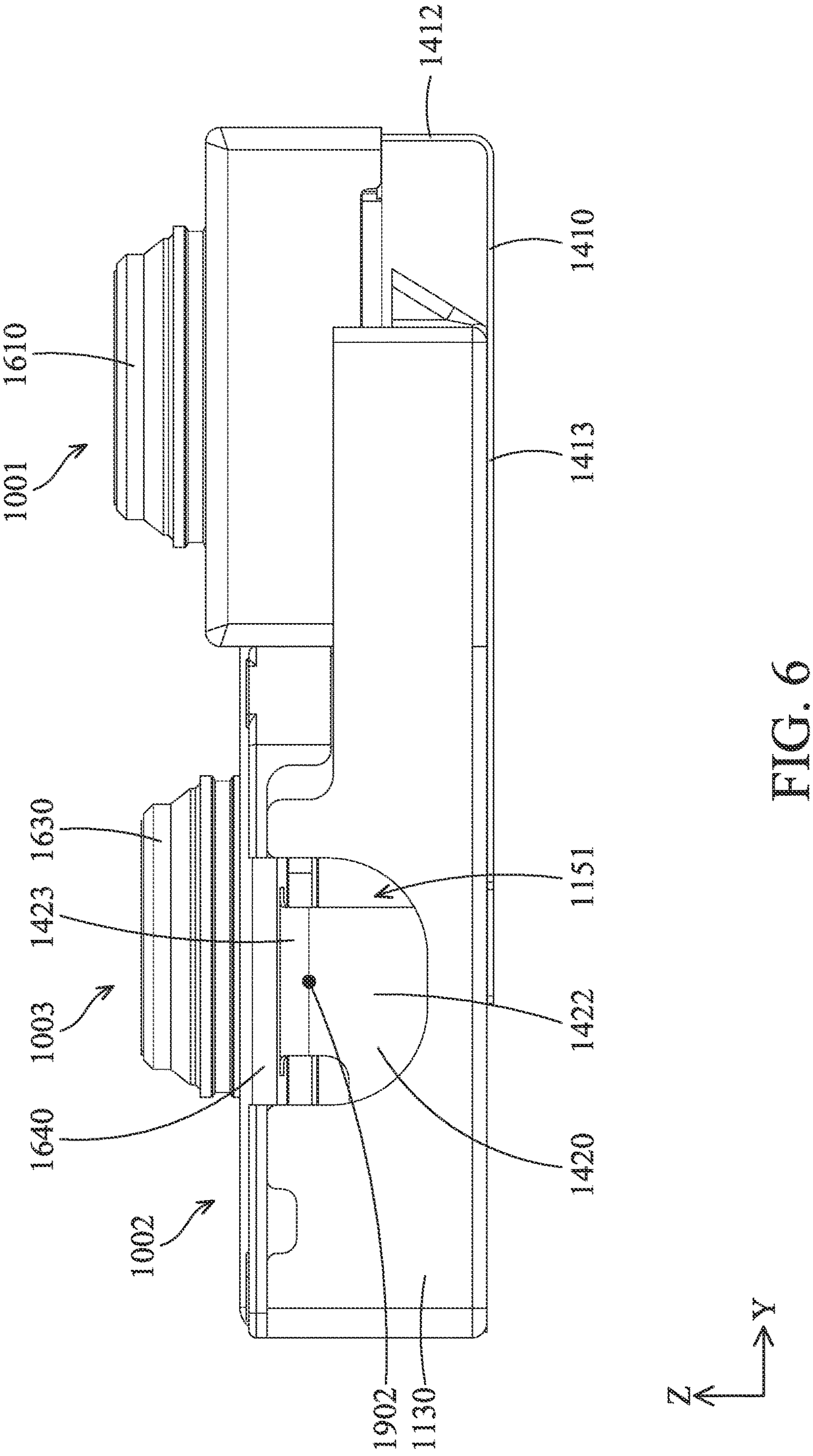
FIG. 6 is a side view of some elements of the optical system.

FIG. 5 is a schematic view of some elements of the optical system 1000. FIG. 6 is a side view of some elements of the optical system 1000. As shown in FIG. 5 and FIG. 6, the second case 1130 may have a first opening 1151, and the second circuit element 1420 may have a fourth segment 1421, a fifth segment 1422, and a bending portion 1423. The fourth segment 1421 may connect to the fifth segment 1422 through the bending portion 1423, and the fourth segment 1421 and the fifth segment 1422 may have different normal vectors. The optical sensor 1640 may be disposed on the fourth segment 1421.

In some embodiments, as shown in FIG. 6, when viewed along a second axis 1902 perpendicular to the first axis 1901 (e.g. along the X direction), the bending portion 1423 may at least partially exposed from the first opening 1151. Therefore, when the second circuit element 1420 moves relative to the fixed portion 1100, the bending portion 1423 and the second case 1130 may be prevented from collide with each other. Furthermore, as shown in FIG. 5, the first optical element driving mechanism 1001 and the optical sensor 1640 may arrange along the third axis 1903, and the third optical element driving mechanism 1003 and the optical sensor 1640 may arrange along the second axis 1902.

Figure 7:
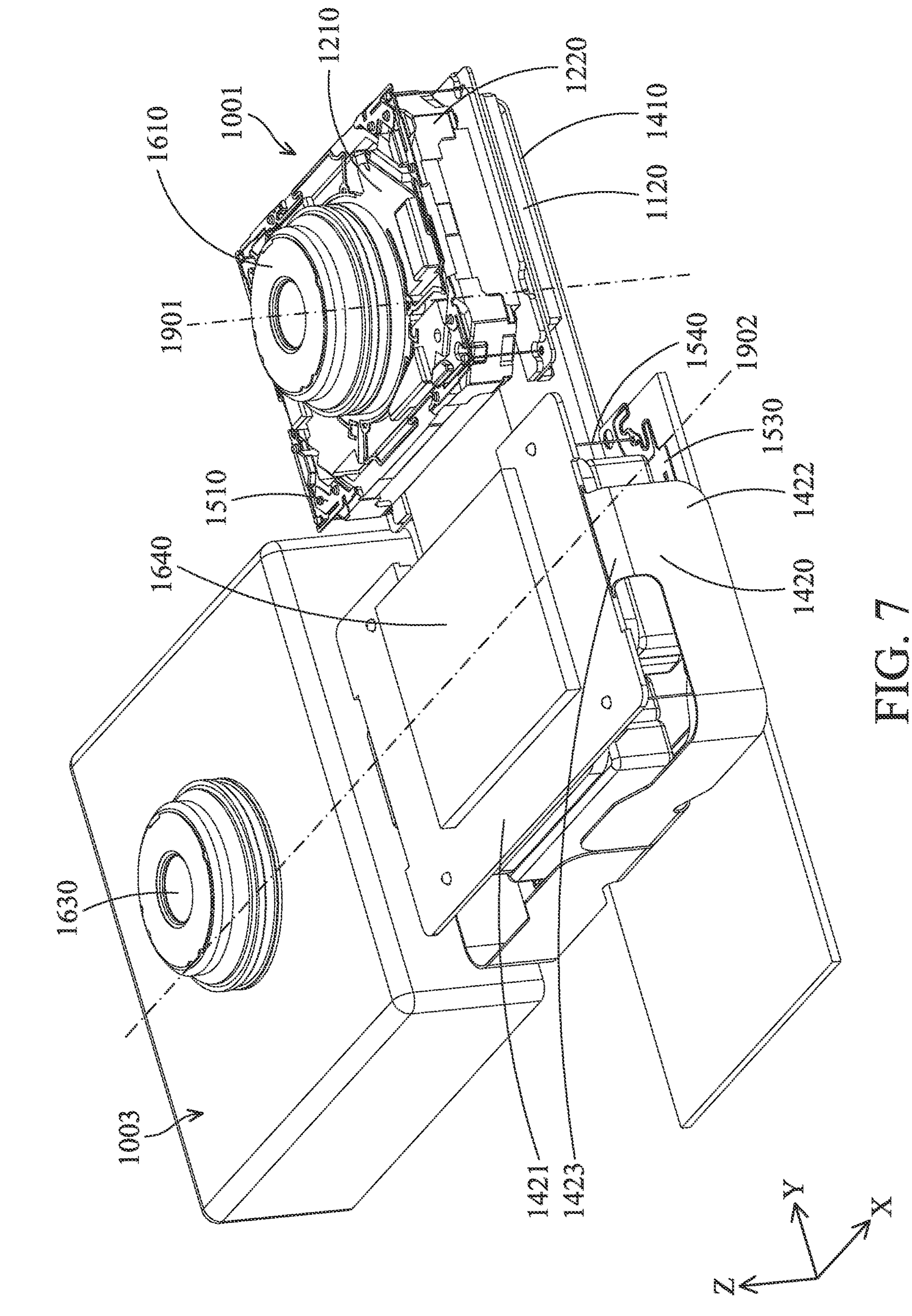
FIG. 7 is a schematic view of some elements of the optical system.
Figure 8:
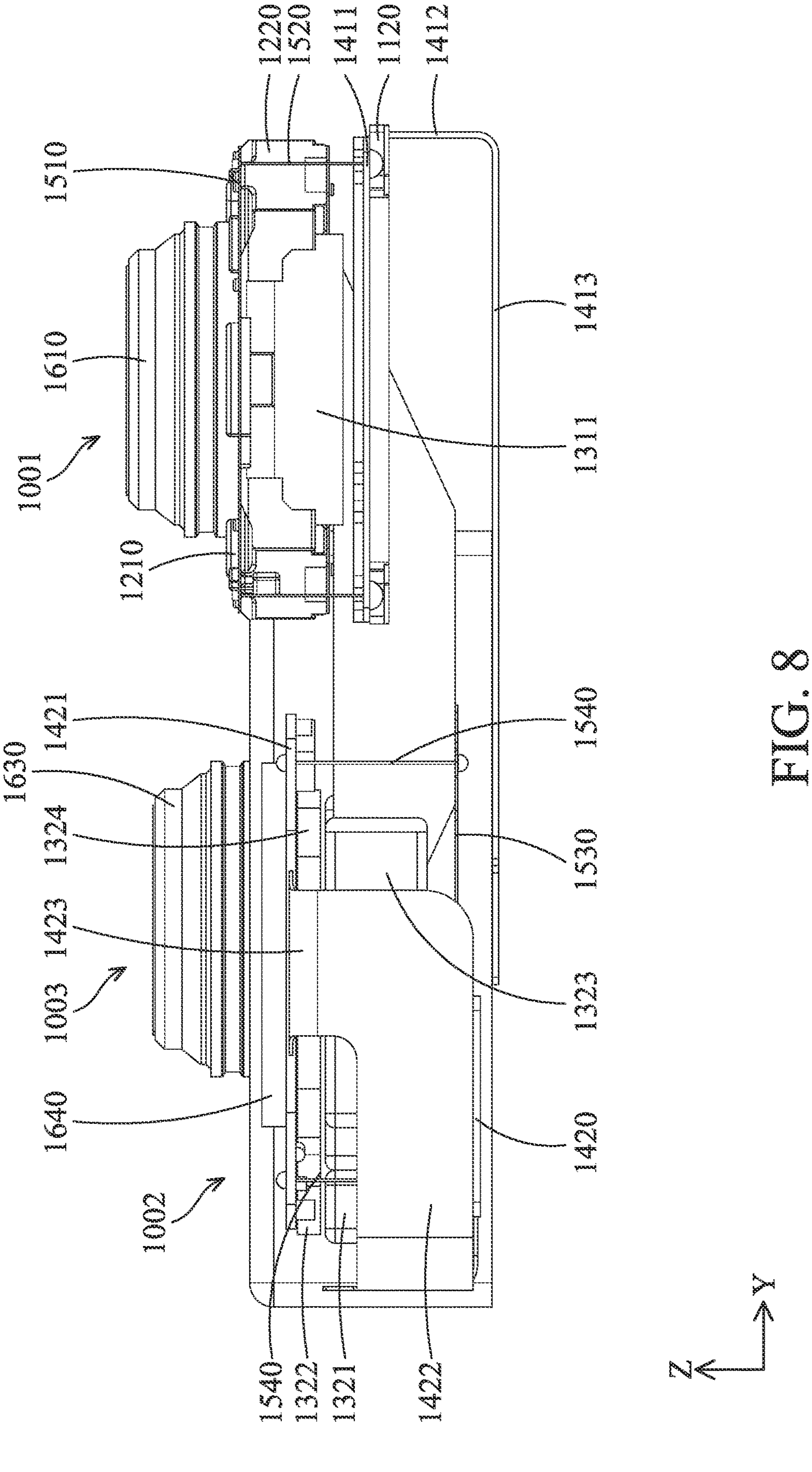
FIG. 8 is a side view of some elements of the optical system.

FIG. 7 is a schematic view of some elements of the optical system 1000. FIG. 8 is a side view of some elements of the optical system 1000. As shown in FIG. 7 and FIG. 8, the first resilient element 1510 and the third resilient element 1530 may be plate-shaped, and the second resilient element 1520 and the fourth resilient element 1540 may be strip-shaped. For example, the first resilient element 1510 and the third resilient element 1530 may be parallel to the second axis 1902 and the third axis 1903 (FIG. 4), and the second resilient element 1520 and the fourth resilient element 1540 may be parallel to the first axis 1901. Furthermore, the second resilient element 1520 and the first resilient element may arrange in the first direction (e.g. the +Z direction), and the third resilient element 1530 and the fourth resilient element 1540 may arrange in the second direction (e.g. the −Z direction).

In some embodiments, as shown in FIG. 4, FIG. 7, and FIG. 8, the first resilient element 1510 may connect to the second resilient element 1520, and the third resilient element 1530 may connect to the fourth resilient element 1540. Moreover, the first resilient element 1510 may directly connect to the first movable portion 1210, the second resilient element 1520 may directly connect to the first bottom 1120, the third resilient element 1530 may directly connect to the second bottom 1140, the fourth resilient element 1540 may directly connect to the second circuit element 1420. In other words, the first movable portion 1210 may connect to the first bottom 1120 through the first resilient element 1510 and the second resilient element 1520, and the second circuit element 1420 may connect to the second bottom 1140 through the third resilient element 1530 and the fourth resilient element 1540, so the first movable portion 1210 and the second circuit element 1420 may movably connect to the first bottom 1120 and the second bottom 1140, respectively. In some embodiments, in a direction that the first axis 1901 extends, the third resilient element 1530 and the third segment 1413 may at least partially overlap each other to reduce the size in other directions to achieve miniaturization.

Figure 9:
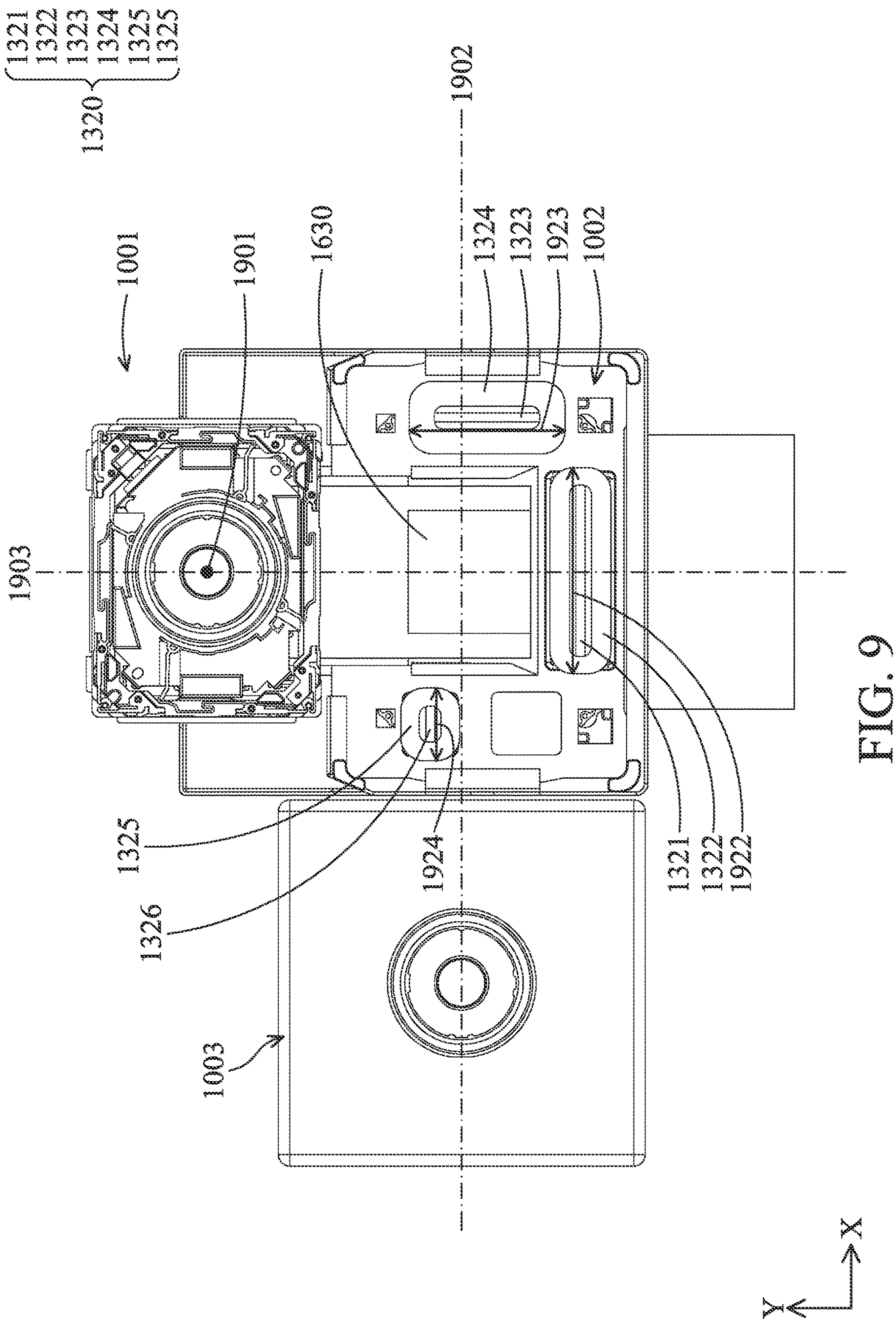
FIG. 9 is a top view of some elements of the optical system.

FIG. 9 is a top view of some elements of the optical system 1000. As shown in FIG. 9, besides the second magnetic element 1321 and the second coil 1322, the second driving assembly 1320 may further include a third magnetic element 1323, a third coil 1324, a fourth magnetic element 1325, and a fourth coil 1326 disposed between the fixed portion 1100 and the second circuit element 1420 to drive the second circuit element 1420 moving relative to the fixed portion 1100. In some embodiments, the third magnetic element 1323 and the third coil 1324 may arrange in a direction parallel to the first axis 1901, and the fourth magnetic element 1325 and the fourth coil 1326 may also arrange in a direction parallel to the first axis 1901.

In some embodiments, as shown in FIG. 9, in the direction that the second axis 1902 extends (e.g. the X direction), the second coil 1322 may have a second length 1922, and the fourth coil 1326 may have a fourth length 1924. In the direction that the third axis 1903 extends, the third coil 1324 may second length 1922, the third length 1923, and the fourth length 1924 may be different. For example, the second length 1922 may be greater than the third length 1923 and the fourth length 1924, and the third length 1923 may be greater than the fourth length 1924.

In summary, an optical system is provided. The optical system includes a first movable portion used for connecting an optical element, a fixed portion, and a first driving assembly used for driving the first movable portion to move relative to the fixed portion. The first movable portion is movable relative to the fixed portion. the first driving assembly is used for driving the first movable portion moving relative to the fixed portion. Therefore, auto focus may be performed, the position of the movable portion may be stabilized, and miniaturization may be achieved.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical system, comprising:

a first movable portion used for connecting a first optical element;

a fixed portion comprising a second bottom used for connecting to a second optical element, wherein the first movable portion is movable relative to the fixed portion; and a first driving assembly used for driving the first movable portion to move relative to the fixed portion;

wherein:

the second optical element comprises a first surface, a second surface, a third surface, a first surface structural region, a second surface structural region, and a third surface structural region;

the first surface structural region, the second surface structural region, and the third surface structural region are disposed on the first surface;

the third surface structural region is between the first surface structural region and the second surface structural region;

the first surface structural region and the first optical element at least partially overlap each other in the direction that a first axis extends;

the second surface and the third surface face the second bottom;

the first surface and the second surface are not parallel or perpendicular;

the first surface and the third surface are not parallel or perpendicular; and the second surface and the third surface are not parallel or perpendicular.

2. The optical system as claimed in claim 1, further comprising a first circuit element disposed on the fixed portion;

wherein:

the fixed portion further comprises a first case and a first bottom;

the first movable portion is disposed between the first case and the first bottom;

the first circuit element comprises a first segment, a second segment, and a third segment;

the first segment connects to the second segment; and the second segment connects to the third segment.

3. The optical system as claimed in claim 2, wherein:

a normal vector of the first segment is not parallel to a normal vector of the second segment;

the normal vector of the second segment is not parallel to a normal vector of the third segment;

the first segment is disposed between the first bottom and the first driving assembly; and the second segment is exposed from the first bottom.

4. The optical system as claimed in claim 3, wherein:

a light enters the first optical element along the first axis;

the first optical element and the second optical element are arranged along the first axis;

the third segment and the second optical element at least partially overlap each other in a direction that the first axis extends; and the third segment and the second bottom at least partially overlap each other in the direction that the first axis extends.

5. The optical system as claimed in claim 4, wherein:

the first surface structural region is transparent;

the second surface structural region is transparent; and the third surface structural region is opaque.

6. The optical system as claimed in claim 5, further comprising an optical sensor, wherein:

the second surface structural region and the optical sensor at least partially overlap each other in the direction that the first axis extends; and the first surface structural region and the second surface structural region do not overlap each other in the direction that the first axis extends.

7. The optical system as claimed in claim 6, wherein:

the first surface structural region at least partially overlaps the second surface in the direction that the first axis extends;

the first optical element at least partially overlaps the second surface in the direction that the first axis extends;

the second surface structural region at least partially overlaps the third surface in the direction that the first axis extends;

the optical sensor at least partially overlaps the third surface in the direction that the first axis extends;

the first surface faces the optical sensor; and the first surface faces the first optical element.

8. The optical system as claimed in claim 7, further comprising a first resilient element, a second resilient element, a third resilient element, a fourth resilient element, and a second circuit element;

wherein:

the first resilient element and the third resilient are plate-shaped;

the second resilient element and the fourth resilient element are strip-shaped;

the first movable portion movably connects to the fixed portion through the first resilient element and the second resilient element; and the second circuit element movably connects to the fixed portion through the third resilient element and the fourth resilient element.

9. The optical system as claimed in claim 8, wherein:

the first resilient element directly connects to the first movable portion;

the second resilient element directly connects to the first bottom;

the third resilient element directly connects to the second bottom; and the fourth resilient element directly connects to the second circuit element.

10. The optical system as claimed in claim 9, wherein:

the third resilient element and the third segment at least partially overlap each other in the direction that the first axis extends;

the second circuit element comprises a fourth segment, a bending portion, and a fifth segment;

the fourth segment connects to the fifth segment through the bending portion;

the optical sensor is disposed on the fourth segment;

normal vectors of the fourth segment and the fifth segment are different;

the fixed portion further comprises a second case;

the second case comprises a first opening; and at least a portion of the bending portion is exposed from the first opening when viewed along a second axis perpendicular to the first axis.

11. The optical system as claimed in claim 10, further comprising a second driving assembly used for driving the optical sensing element to move relative to the fixed portion;

wherein:

the first driving assembly comprises a first magnetic element and a first coil;

the second driving assembly comprises a second magnetic element and a second coil;

the first coil and the first magnetic element are arranged in a first direction;

the second coil and the second magnetic element are arranged in a second direction;

the first direction is parallel to the first axis;

the second direction is parallel to the first axis;

the first direction and the second direction are opposite;

the second resilient element and the first resilient element are arranged in the first direction; and the third resilient element and the fourth resilient element are arranged in the second direction.

12. The optical system as claimed in claim 11, wherein:

a third axis is perpendicular to the first axis and the second axis;

the first driving assembly is used for driving the first optical element moving along a direction parallel to the third axis;

the second driving assembly is used for driving the optical sensor moving along the direction parallel to the third axis; and movable strokes of the first optical element and the optical sensor in the third axis are different.

13. The optical system as claimed in claim 12, wherein:

the movable stroke of the first optical element in the third axis is greater than the movable stroke of the optical sensor in the third axis;

the fixed portion further comprises a shell;

the first case and the first bottom are arranged in the second direction;

the first case and the second bottom are arranged in the second direction;

the second case and the second bottom are arranged in the first direction;

the shell and the second case are arranged in the second direction; and the shell and the second bottom are arranged in the second direction.

14. The optical system as claimed in claim 13, wherein:

the shell and the first case do not overlap each other in the direction that the first axis extends;

the shell and the first bottom do not overlap each other in the direction that the first axis extends;

the second bottom and the first case at least partially overlap each other in the direction that the first axis extends;

the second bottom and the first bottom at least partially overlap each other in the direction that the first axis extends; and the third segment is disposed on the second case.

15. The optical system as claimed in claim 14, wherein:

the second bottom comprises a recess;

the second magnetic element is disposed in the recess;

the optical sensor and the second coil are disposed on opposite sides of the second circuit element in the direction that the first axis extends;

the second magnetic element is exposed from the recess in the direction that the first axis extends;

the second magnetic element does not overlap the second coil in the direction that the second axis extends; and the second bottom does not overlap the second coil in the direction that the second axis extends.

16. The optical system as claimed in claim 15, wherein:

the second magnetic element and the second optical element are arranged along the third axis; and the second bottom and the second optical element are arranged along the first axis.

17. The optical system as claimed in claim 16, wherein:

the second driving assembly further comprises a third magnetic element, a third coil, a fourth magnetic element, and a fourth coil;

the third magnetic element and the third coil are arranged along the direction parallel to the first axis;

the fourth magnetic element and the fourth coil are arranged along the direction parallel to the first axis;

the second coil has a second length in the direction that the second axis extends;

the third coil has a third length in the direction that the third axis extends;

the fourth coil has a fourth length in the direction that the second axis extends;

the second length and the third length are different;

the second length and the fourth length are different; and the third length and the fourth length are different.

18. The optical system as claimed in claim 17, wherein:

the second length is greater than the third length;

the second length is greater than the fourth length; and the third length is greater than the fourth length.

19. The optical system as claimed in claim 18, further comprising a third optical element driving mechanism, wherein:

the third optical element driving mechanism and the optical sensor are arranged along the second axis;

the first optical element and the optical sensor are arranged along the third axis;

the shell and the optical sensor at least partially overlap each other in the direction that the first axis extends; and the shell and the third optical element driving mechanism do not overlap each other in the direction that the first axis extends.

* * * * *